United States Patent [19]
Radosav et al.

[11] Patent Number: 5,490,682
[45] Date of Patent: Feb. 13, 1996

[54] SPLIT MECHANICAL FACE SEAL

[75] Inventors: Jon J. Radosav, Glenview; David M. Dudek, Schaumburg; Orest T. Browar, Chicago; Angelo G. Ralle, Palatine, all of Ill.

[73] Assignee: John Crane Inc., Morton Grove, Ill.

[21] Appl. No.: 391,619

[22] Filed: Feb. 21, 1995

Related U.S. Application Data

[63] Continuation of Ser. No. 42,867, Apr. 5, 1993, abandoned, which is a continuation-in-part of Ser. No. 805,470, Dec. 10, 1991, Pat. No. 5,199,720, which is a continuation of Ser. No. 529,208, May 25, 1990, Pat. No. 5,114,163.

[51] Int. Cl.⁶ ..................................................... F16J 15/38
[52] U.S. Cl. ........................... 277/815; 277/82; 277/92; 277/93 R
[58] Field of Search ................................... 277/5, 6, 7, 8, 277/82, 815, 81 R, 92, 85, 93 R, 935 D, 187, 192, 195, 198, 182, 186, 197; 384/139, 481, 590

[56] References Cited

U.S. PATENT DOCUMENTS

| | | |
|---|---|---|
| 1,294,620 | 2/1919 | Clarke . |
| 2,503,086 | 4/1950 | Albright . |
| 2,855,003 | 10/1958 | Thaxton . |
| 2,871,040 | 1/1959 | Payne . |
| 2,921,806 | 1/1960 | Carter . |
| 2,995,391 | 8/1961 | Snyder . |
| 2,996,319 | 8/1961 | Copes . |
| 3,025,070 | 3/1962 | Copes . |
| 3,031,199 | 4/1962 | Laser et al. . |
| 3,061,319 | 10/1962 | Snyder . |
| 3,117,796 | 1/1964 | Liebig . |
| 3,291,493 | 12/1966 | Blair . |
| 3,536,333 | 10/1970 | Gits et al. . |
| 4,145,059 | 3/1979 | Imai et al. . |

(List continued on next page.)

FOREIGN PATENT DOCUMENTS

| | | |
|---|---|---|
| 0186811 | 9/1986 | European Pat. Off. . |
| 0312196 | 4/1989 | European Pat. Off. . |
| 472929 | 7/1991 | European Pat. Off. . |
| 605360 | 5/1926 | France . |
| 2646475 | 12/1977 | Germany . |
| 8908050 | 8/1989 | Germany . |
| 612484 | 7/1979 | Switzerland . |
| 724301 | 2/1955 | United Kingdom . |
| 878371 | 9/1961 | United Kingdom . |
| 941849 | 1/1963 | United Kingdom . |
| 917693 | 2/1963 | United Kingdom . |
| 2119875 | 11/1983 | United Kingdom . |

OTHER PUBLICATIONS

"Design and Application of Split Mechanical End Face Seals", *Journal of the American Society of Lubrication Engineers*, Jun. 1978, pp. 304 et. seq.
Mechanical Seal Design Manual 10, *Burgman*, p. 82 (publication date unknown).

*Primary Examiner*—Daniel G. DePumpo
*Attorney, Agent, or Firm*—Dorn, McEachran, Jambor & Keating

[57] ABSTRACT

A totally split mechanical face seal being installable and replaceable without necessitating breakdown of the shaft and/or housing. The inventive split seal is well suited for replacement of packing or stuffing in heavy duty or inaccessible locations. The inventive seals include a sealing element that seals the primary ring against the shaft and rigidly positions the primary ring in the axial, circumferential and radial directions, and also includes a sealing element which seals the mating ring against the housing and non-rigidly positions the mating ring in the axial direction while simultaneously providing an axial biasing force on the mating ring to provide mating contact of the two rings. For applications where gross displacements of the shaft relative to the housing are expected, a thrust bearing or a connection is made between the mating ring assembly and rotating elements associated with shaft. Alternatively, a bearing assembly is provided for maintaining the axial position of the primary ring assembly and both primary and mating rings are held in approximately the same positions relative to each other regardless of the gross shaft displacements.

20 Claims, 3 Drawing Sheets

U.S. PATENT DOCUMENTS

| | | | |
|---|---|---|---|
| 4,381,867 | 5/1983 | Ohgoshi | 277/82 |
| 4,410,188 | 10/1983 | Copes | |
| 4,417,503 | 11/1983 | Izumi | |
| 4,418,919 | 12/1983 | Wentworth | 277/92 |
| 4,421,329 | 12/1983 | Jelinek | |
| 4,423,878 | 1/1984 | Escue | |
| 4,576,384 | 3/1986 | Azibert | 277/815 |
| 4,809,992 | 3/1989 | Kemp, Jr. et al. | |
| 4,842,286 | 6/1989 | Heilala | |
| 4,858,936 | 8/1989 | Adams | |
| 5,114,163 | 5/1992 | Radosav et al. | 277/92 |

5,490,682

SPLIT MECHANICAL FACE SEAL

RELATED APPLICATIONS

This is a continuation application of application Ser. No. 08/042,867 filed on Apr. 5, 1993, now abandoned, which is a continuation-in-part of application Ser. No. 07/805,470 filed on Dec. 10, 1991, now U.S. Pat. No. 5,199,720, which is a continuation of application Ser. No. 07/529,208 filed on May 25, 1990, now U.S. Pat. No. 5,114,163.

BACKGROUND OF THE INVENTION

The related patent, U.S. Pat. No. 5,114,163, of which this is a continuation-in-part, includes an embodiment illustrated in FIG. 8 for applications in which the shafts of the operating devices, such as pumps or turbines, are subject to greater axial shifts than those which would normally be expected. The design of that embodiment utilizes a thrust bearing to move a rotationally stationary split holder in conjunction with the axial movement of the shaft. That portion of the specification relating to the embodiment of FIG. 8 and other relevant portions of U.S. Pat. No. 5,114,163 are incorporated by reference herein where appropriate.

The FIG. 8 embodiment referenced in parent U.S. Pat. No. 5,114,163 by and large is able to withstand axial displacements of small proportions, on the order of ½ to 1 inch. However, any axial displacements greater than these would be hampered by the obstruction of the housing against the split holder member, which has only a limited degree of freedom in the axial direction before the seal formed by the O-ring disposed between the split holder member and the housing fails. Alternatively, the radially extending shoulder portion of the split holder will impinge on the radially extending wall of the housing.

Thus, what is necessary is a split mechanical face seal which can withstand much greater proportional axial displacements, up to 6 inches, without sacrificing the sealing characteristics of the split seal elements.

SUMMARY OF THE INVENTION

Accordingly, what is disclosed herein is a split mechanical face seal for providing fluid-tight sealing between a housing and a shaft adapted to rotate relative thereto comprising adjacent, rigid, annular, primary and mating rings formed of a plurality of arcuate ring segments, each defining generally radial, opposed sealing faces, means for joining and retaining the ring segments of each of the rings in rigid connection with the other segments of each ring, whereby each opposed sealing face defined by the rings has a smooth surface devoid of discontinuities around its complete circumference, the joining and retaining means further comprising a resilient split means for the primary ring and a resilient split means for the mating ring, each resilient split means positioning and supporting its associated ring in a generally coaxial relationship with the shaft and with the other ring, so that the sealing face of each ring is in opposite and facing relationship to the sealing face of the other ring, said resilient split means for the primary ring rigidly supporting the primary ring from axial and radial movement, the resilient split ring for said mating ring nonrigidly supporting the mating ring and biasing the mating ring in an axial direction against the primary ring and a split holder means for the mating ring and a split holder means for the primary ring each circumferentially connecting the respective resilient split means to its associated ring in a substantially concentric relationship, each split holder means comprising a pair of semicircular holder members releasably attachable to each other and when in an attached condition, sealingly engaging and compressing to a limited degree at least a portion of each respective resilient split means upon its associated segmented ring, and the seal further comprising a split relative positioning means for maintaining the position of the split mating ring holder means relative to the split primary ring holder means in substantially identical relative axial positions during shaft rotation despite relative rotation between the primary ring holder means and the mating ring holder means and despite temporarily large axial displacements of the shaft relative to the housing.

DETAILED DESCRIPTION OF THE PREFERRED EMBODIMENTS

Figure 1:
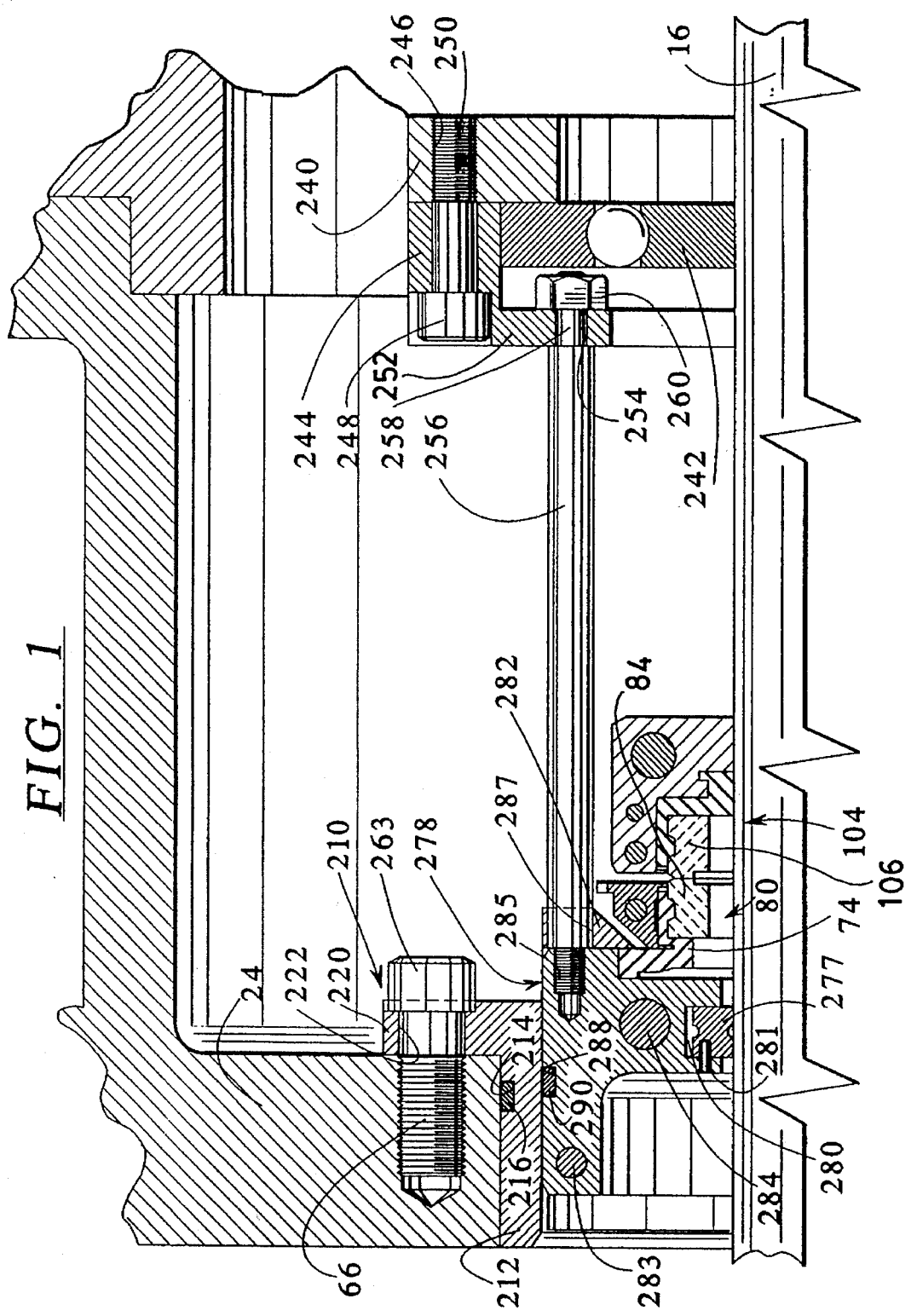
FIG. 1 illustrates an embodiment according to the present invention.

FIG. 1 includes a number of elements which are common to the description and illustration of the embodiment of FIG. 8 of the prior U.S. Pat. No. 5,114,163, and like elements will be designated by an identical identification numeral. Where similar, but not identical, elements are shown, the elements will be designated by a similar numeral with a digit prefix in a different hundred series. For example, in the FIG. 1 embodiment, the sealing element or compression ring 74 is essentially identical to the compression ring 74 (FIGS. 4A, 4C of the '163 patent). Conversely, the similar gland plate 282 (FIG. 1) is not identical to the gland plate 182 (FIG. 8 of the '165 patent) hence the different hundred series digit prefix.

The split seal elements of the embodiment of FIG. 1, specifically the elements of the primary ring assembly 104 and of the mating ring assembly 80, are essentially identical to the corresponding elements illustrated in FIGS. 4A, 4C, 5B and 5C of the '163 patent. The attachment of the ring assemblies 80, 104 to the shaft 16, FIG. 1, are essentially identical to the corresponding attachment structure and procedure of the ring assemblies 80, 104 of the embodiments of FIGS. 4A and 8 of the '163 patent. For a detailed description of the structure and attachment procedure of the ring assemblies 80, 104 and of the compression ring 74, reference is had to the appropriate sections described in U.S. Pat. No. 5,114,163.

The split gland plate 282 may also be identical to gland plate 82, but is shown with a smaller outer diameter to accommodate smaller diameters of those elements which are adjacent the gland plate 282. In other respects, gland plate 282 is attached to an adapter ring 278 by a plurality of screws (not shown), similar to the attachment of gland plate 182 to the adapter ring 178 (FIG. 8 of the '163 patent), with sufficient overlap of the inner diameter edge of the gland plate 282 over the compression ring 74 to squeezably retain the sealing lip 72 against the adapter ring 278 and thus, to maintain seal integrity.

A significant difference in the embodiment of FIG. 1 from the embodiment of FIG. 8 of the '163 patent is the lack of a thrust bearing. Thus, the adapter ring 278 is not axially translatable relative to the shaft 16 because a mechanism to maintain a constant relative position between the shaft 16 and the adapter 278, according to the present invention, will be explained below. The adapter ring 278 is axially translatable with the shaft relative to the housing 24 during rotation of the shaft 16.

Adapter ring 278 comprises a pair of split semicircular members attached to each other by bolts 283, 284 in accordance with the attachment of adapter ring 182 of the FIG. 8 embodiment of the '163patent by screws (not shown) which are inserted and tightened within corresponding apertures to provide a single, integral annular adapter ring. Along an inner diameter wall of the adapter ring 278, an annular groove 280 is disposed for surrounding a bushing 277. The inner diameter dimension of the adapter ring 278 is greater than the diameter of shaft 16 so that after assembly, the adapter ring 278 does not come into contact with the shaft 16. The outer diameter of adapter ring 278 is smooth and is in the shape of a cylinder with an axial centerline coincident with the centerline of shaft 16. An annular groove 290, disposed along the outer diameter cylindrical surface, encloses an O-ring 288 which provides for sealing the adapter ring 278 against an inner diameter surface, as will be explained below, similar to the function provided by groove 190, and O-ring 188 (FIG. 8 of the '163 patent). The cylindrical shape of the outer diameter of adapter ring 278 lends itself to essentially unobstructed axial movement within the inner diameter axial surface of the bore.

A plurality, preferably four, of threaded bores 285 extending along an axial direction are equidistantly disposed around the periphery of the adapter ring 278. The threaded holes 285 are disposed radially outwardly of the seal ring assemblies 80, 104 so that there is sufficient room for clearance of other elements which may be threaded into holes 285. The gland plate 282 also includes cutouts or apertures 287 which correspond to the threaded holes 285 and provide clearance for attaching such elements into the threaded holes 285, as will be explained below.

The annular groove 280 substantially surrounds the bushing 277. The bushing 277 is compressed by the groove 280 around the shaft 16. One or more pins, such as pin 281, are inserted within corresponding apertures disposed in the radially extending sidewall of groove 280 and the radially extending wall of the bushing 277 in order to maintain the bushing 277 stationary relative to the adapter ring 278 during shaft rotation. The shaft rotates within the inner diameter of the bushing 277, which is held in place by the walls of the annular groove 280 and by pin 281. The bushing 277 may comprise a rigid but flexible material which provides slideability against the outer diameter surface of shaft 16. Bushings made from TEFLON, a material available from dupont, have been found to adequately provide the necessary characteristics.

The function of the bushing 277 is not to seal within the annular groove, but to provide a partial screen for contaminants or other debris which may be contained in the process fluid within the housing 24. Under normal conditions, the bushing 277 should thus impede the contaminants from entering the space adjacent the sealing rings which could cause damage to the elements of the sealing ring assemblies 80, 104, and particularly to the rings 84, 106.

The FIG. 8 embodiment of the '163 patent shows the adapter ring 178 being sealed directly onto the housing 24 or stuffing box wall, and the embodiment of FIG. 1 may also be sealed directly to the housing 24. Preferably, however, there is provided a second stationary annular adapter 210 which may be split into two separate semicircular rings which are attached to each other by bolts (not shown) in the way the other rigid split semicircular split elements are attached. The adapter 210, when assembled, includes a cylindrical tubular extension 212 which has an outer diameter that matches the inner diameter of the stuffing box wall of housing 24. An annular groove 214 provides an enclosure for an O-ring 216 that seals the adapter 210 to the wall of the housing 24.

A radially extending annular flange 220 of adapter 210 includes a radially extending wall which parallels the radially extending wall of the housing 24 and abuts thereto. The flange includes a plurality, preferably four, through bores 222 which permit insertion of a plurality of threaded bolts 222 such as bolt 263. The bolts 263 screw into threaded apertures 66 in the wall of housing 24, much like in the embodiment shown in FIG. 4A of the '163 patent.

The threaded bolts 263 retain the adapter 210 in position against the housing 24, and the inner diameter of the stationary adapter 210 provides a smooth cylindrical surface which allows for axial movement of the adapter ring 278 within the annular space provided between the shaft 16 and the adapter 210. Simultaneously, the O-ring 290, made from an elastomer, is provided with a clean, smooth surface against which to seal. Such a clean, smooth surface is not always available along the inner diameter wall of a stuffing box which has corroded over a number of years use in retaining packing material. As noted above, the rigid but flexible bushing 277 has the capability of sliding axially along the surface of the shaft 16, while simultaneously screening the sealing area from entry of contaminants in the process fluid.

Unlike the FIG. 8 embodiment of the '163 patent, which utilizes a thrust ring (176) as a mechanism for maintaining the mating ring assembly 80 in the desired axial position relative to the shaft, a different positioning maintaining means is employed. A unique mechanism, as contemplated by the present invention, for retaining the relative axial position is provided by a connection of the adapter ring 278 to a bearing assembly housing 240 which houses a set of bearings 242. The bearings 242 are attached to the shaft 16 to permit the shaft to rotate within housing 240.

A bearing housing adapter 244, which preferably also is split, is provided for direct attachment to the bearing housing 240 by means of insertion through plural apertures, such as aperture 246, a plurality of threaded bolts 248. Each threaded bolt 248 is screwed into a corresponding threaded bore 250 in the bearing housing 240. Thus, the bearing housing adapter 244 is fixed both rotationally and axially relative to the bearing housing 240 and relative to the shaft 16.

The bearing housing adapter 244 comprises a radially extending flange 252 which also includes a plurality of apertures 254. The number of and disposition of the apertures 254 are identical and correspond to the threaded bores 285 disposed in the adapter ring 278. The apertures 254 are generally at the identical radial distance, relative to the shaft centerline, with the threaded holes 285 and also extend axially so that, when assembled, corresponding threaded holes 285 and apertures 254 have coincident centerlines.

Disposed within the space between each corresponding pair of threaded holes 285, apertures 254 is a threaded rod 256. At one end of rod 256, the threads correspond to the threads on the threaded holes 285 and each rod 256 is threaded into the holes 285. At the other end, the rod 256 comprises a smaller diameter extension 258 which can be inserted through the aperture 254. The end of extension 258 is also threaded, and after insertion through the apertures 254, each rod 260 is attached to the radial flange 252 of the bearing housing adapter 244 by a threaded nut 260 having corresponding threads. Tightening nut 260 effectively rigidly attaches the mating ring adapter 278 to the bearing housing 240. Thus, the rods 256 cause the ring adapter 278 and the mating ring assembly 80 to move axially together with the bearing housing 240 and with the shaft 16, even though those elements also are not rotating therewith.

Because the primary ring assembly 104 is attached to the shaft 16, it necessarily rotates therewith and also moves axially therewith. Thus, the axial movement of the ring assembly 104 matches the axial movement of the ring assembly 80, connected to the shaft, and the relative spacing between them is maintained such that the seal faces are kept in contact with each other by the compression ring 74 to provide a sealing function through axial movements of the shaft of much greater dimension. That sealing function will be maintained for as long as the O-ring 290 remains in contact with the inner diameter wall of the stationary second adapter 212.

Figure 2:
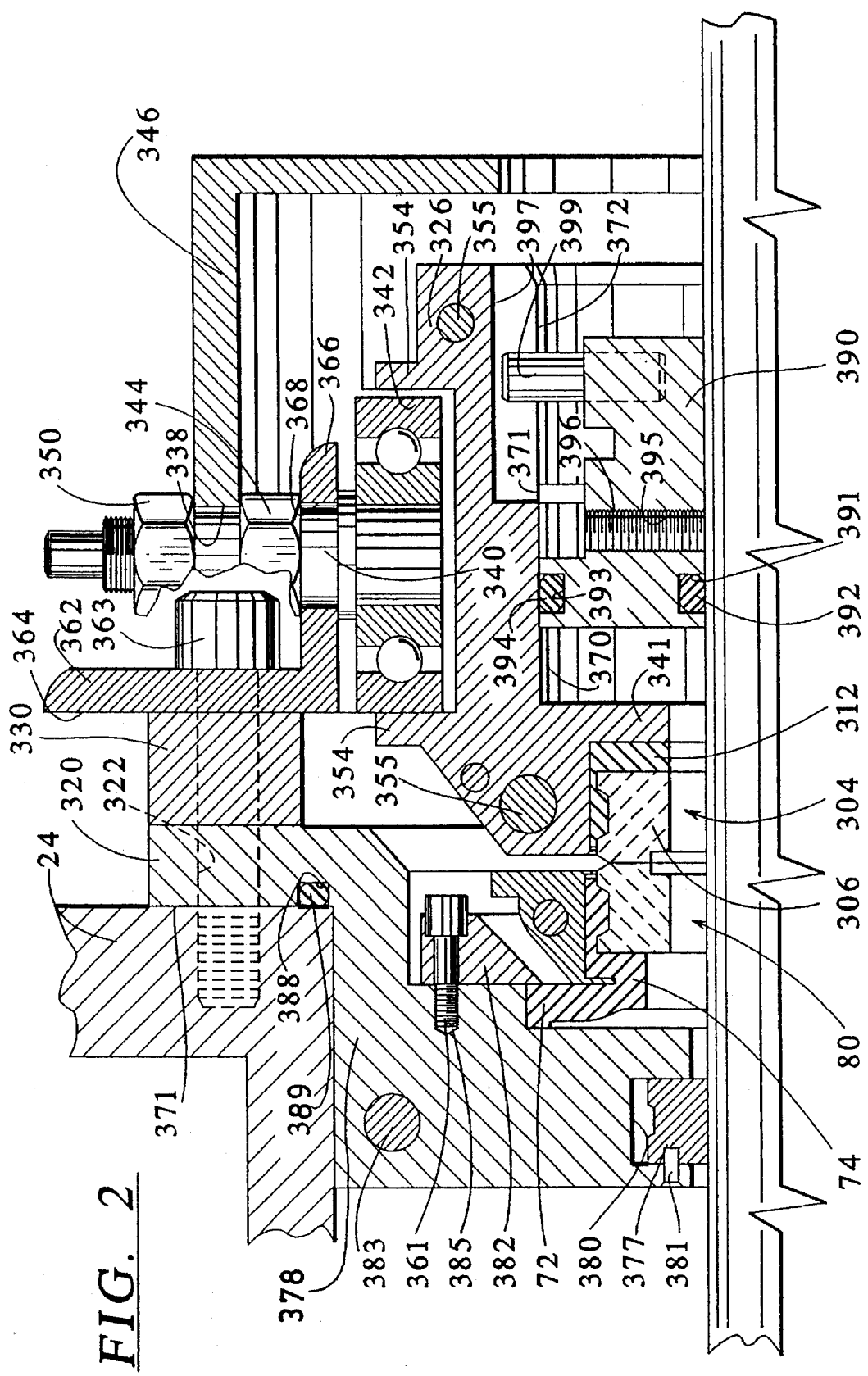
FIG. 2 illustrates another embodiment of the present invention.
Figure 3:
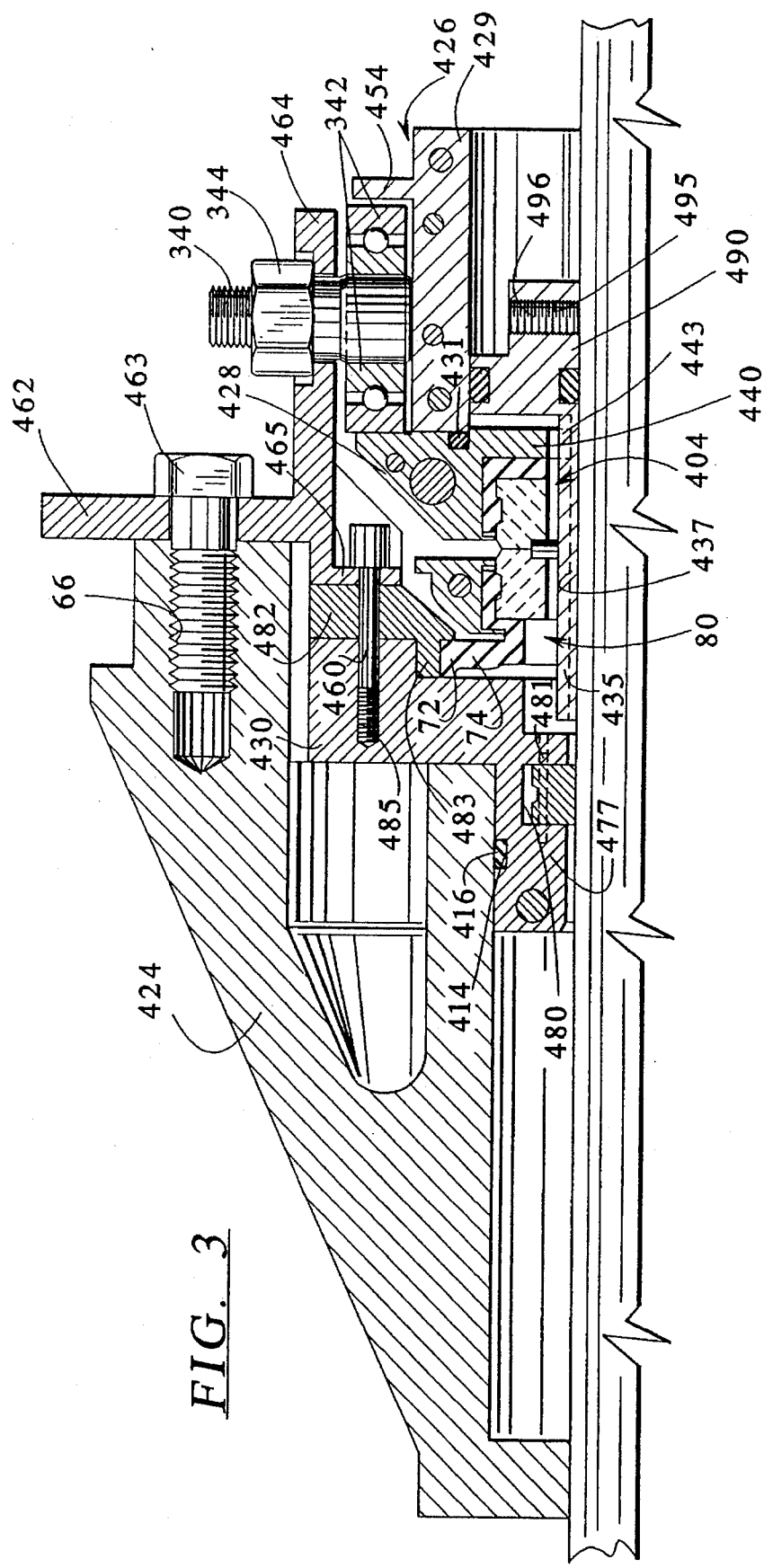
FIG. 3 is an alternative embodiment of the invention.

Whereas the embodiment of FIG. 1 maintains the seal assemblies 80 and 104 together by axially moving them in conjunction with the shaft 16, the other two embodiments, illustrated in FIGS. 2 and 3, utilize a converse principle, which is to maintain the seal assemblies stationary, while allowing unimpeded axial movement of the shaft 16 within the annular space around which the seal assemblies are assembled. Again, in describing the embodiments of FIGS. 2 and 3, those elements which are essentially identical with the elements of FIGS. 4A of the '163 patent will be designated by the same numerals while similar or like elements will be designated by a numeral which has a first digit prefix in a different hundred series.

FIG. 2 illustrates an embodiment having an identical mating ring 80 and compression ring 74 as that of the FIG. 4A embodiment of the '163 patent; the seal face configuration may be found in the embodiment of FIG. 9 of the parent of the '163 patent. The primary ring assembly, generally designated at 304, also has a primary ring 306 similar to that of the FIG. 9 embodiment of the '163 patent. There are differences in other respects, and those different elements will be designated by numerals having a first digit prefix from the 300 series.

The compression ring 74 has a similarly disposed lip 72 which is compressed and retained by a gland plate 382 which is identically identical to gland plate 282 (FIG. 1) and is retained by plural screws 361 (not shown) equidistantly disposed around the periphery of the gland plate 382.

The lip 72 is retained against a stationary adapter 378 which itself is attached directly to a housing 24 by means of a threaded bolt 363 inserted through an aperture 322 in a radially extending flange 320 of the adapter 378 and then threaded into a threaded bore 66 in the housing 24. Bolts 383 join together the two semi-circular halves of the adapter 378 in the manner of the adapter 278.

The radially extending flange 320 comprises a radially extending wall 371 which abuts the radially extending wall of housing 24. The body of the adapter 378 also comprises an axially extending cylindrical surface which follows the inner radial axially extending wall of the stuffing box of housing 24, as shown. Appropriate threaded holes provide attachment means for bolts 383 which retain the two semi-circular halves of the adapter 378 together, similar to the other rigid split elements. An annular groove 388 in the radially extending wall 371 of flange 370 surrounds an O-ring 389 and compresses a seal between adapter 378 and housing 24.

As described above, the adapter 378 further includes bores 385 for accepting bolts 361 that retain the gland plate 382, and consequently the lip 72 of compression ring 74, against the adapter 378.

Along an inner diameter wall, the adapter 378 includes an annular groove 380 for accepting within it a rigid but resilient bushing 377 held from rotation and axial movement by pin 381. The bushing 377 provides a filtering function for inhibiting large contaminants in the process fluid from entering the space adjacent the seal ring elements, similar to that of bushing 277 (FIG. 1).

Between the flange 320 of the adapter 378 and the socket head of each bolt 363 is an optional spacer 330 and an annular flanged retainer 362. The bolts 363 are inserted through corresponding apertures in the spacer 330 and in one flanged portion 364 of the retainer 362.

Another flanged portion 366 also comprises an aperture 368 through which a bolt 340 is inserted. A bearing assembly 342 is attached to one end of the bolt 340. The other end of the bolt 340 is threaded and a nut 344 is tightened over the threaded bolt 340 to retain the bolt 340 and bearing assembly 342 in place on the flanged portion 366. Optionally, a splash guard 346 may be positioned around the flanged portion 366 before the bolt 340 is inserted. The splash guard 346 includes plural apertures which correspond to the apertures 338 of the retainer flanged portion 366, so that insertion of the bolt 340 will be accomplished through both apertures 338 and 368. A second nut 350 screwed onto bolt 340 tightens and retains the splash guard 346 over the sealing ring assemblies 80, 304 as well as over the bearing assembly 342. The guard 346 maintains the seal area free of contaminants and other unwanted debris which can enter the seal area from outside the housing.

The bearing assembly 342 is disposed between two radially extending annular walls 354 of the holder 326. The function of the bearing assembly 342 disposed within walls 354 is to inhibit axial movement of the holder 326 when the shaft 16 is rotating and simultaneously moving in the axial direction, as will be explained below.

The holder 326, as are all of the rigid elements of the split seal, comprises two semicircular split members that are joined together by threaded bolts 355 which are screwed into corresponding threaded bores in the opposite split member, as is explained in U.S. Pat. No. 5,114,163.

The holder member 326 also is dissimilar from holders 126 (FIGS. 4A, 8 and 9 of the aforementioned '163 patent) in that the holder 326 (FIG. 2) does not come into contact with shaft 16 after the seal is assembled. Accordingly, the base defining the flanged supports 140 (FIG. 4A of the '163 patent) have been omitted altogether. Similarly, the shaft sealing portion 120 of the sealing element 112 (FIG. 4A of the '163 patent) has also been omitted, so that the corresponding holder base 341 and sealing element 312 are truncated and are disposed radially outwardly of the shaft 16, thus leaving an annular space between the primary seal ring assembly 304 and the shaft 16 which allows for free axial movement of the shaft 16 relative to the primary ring assembly 304.

The primary seal ring assembly 304 is, however, rotating with the shaft 16 during shaft rotation. An annular step recess 370 in the holder 326 is disposed radially outwardly of the base 341 providing an annular space between the shaft 16 and the recess 370. The recess includes a second step 372 which facilitates removal of the shaft, as will be explained below.

A drive member or drive sleeve 390 is disposed in the annular space provided by the first step recess 370. The drive sleeve 390 has an inner diameter surface which is approximately the same diameter as the diameter of shaft 16. The inner diameter surface includes an annular groove 391 in which an O-ring 392 has been disposed for sealing between the drive sleeve 390 and the shaft 16. The outer diameter surface is approximately the same diameter as the inner diameter surface of the recessed step 370, and includes a second annular groove 393 in which an O-ring 394 has been inserted for sealing between the outer diameter surface of the drive sleeve 390 and the recessed step 370.

The drive sleeve 390 includes several threaded, equidistantly spaced, radially extending grooves 395 into which set screws 396 are screwed. The set screws 396 impinge upon the surface of the shaft 16 and hold the drive sleeve 390 fast to the shaft 16. The drive sleeve, of course, is comprised of two semi-circular halves which are joined together by threaded bolts (not shown), as are all of the other rigid split elements.

During seal operation when the shaft 16 is rotating, the drive sleeve 390 rotates together with the shaft. The frictional forces between the O-ring 394 and the stepped inner diameter surface of the stepped recess 370 of the holder 326 causes the holder 326 to rotate together with the shaft and with the drive sleeve.

For greater assurance of coaction, a positive drive mechanism is preferably used in conjunction with the frictional hold of the O-ring 394. The positive drive mechanism comprises one or more pins, such as drive pin 399, which are attached by threads or other appropriate means to a shoulder of the drive sleeve 390. The drive pins 399 extend radially outwardly toward the holder 326 and engage with an axially extending longitudinal slot 397 cut into the inner diameter of the second step recess 372. The width of the slot 397 is of a dimension to permit axial movement of the drive pin 399, but any rotational movement of the pins 399 will cause the pins 399 to engage the walls of the slot 397 to drive the holder 326 rotationally with the shaft 16. Thus, while the holder 326 is caused to rotate together with the drive sleeve 390 and the shaft 16, relative axial movement of the drive sleeve 390 and shaft 16 is facilitated relative to the holder 326. The bearing assemblies 342 permit the holder 326 to rotate with the shaft 16 but inhibit relative axial movement of the holder relative to the housing 24 and the other stationary seal elements.

The axial length of the first recessed step 370 is preferably sufficient to accommodate the maximum expected axial shifts of the shaft 16 during shaft rotation and operation of the operating device. The second recessed step 372 provides a quick and easy means to move the shaft axially for repairs and maintenance of the device elements, such as the impeller. To accomplish this, the shaft connection to the device such as to the bearings (not shown) is first disconnected and the shaft is then slid axially toward the right, as shown in FIG. 2. When the O-ring 394 reaches the step 372, the drive sleeve 390 and shaft 16 are able to move more freely because frictional forces between the O-ring 394 and the step 370 are no longer impeding axial movement of the shaft. As described above, the bushing 377 provides little frictional force because of the flexibility and material comprising the bushing 377 allowing the shaft 16 to slide easily relative to the bushing 377.

After repairs of the device elements are completed, the shaft 16 is again slid into place. This process is facilitated by a truncated frusto-conical connection 371 between the two steps 370, 372 of the recessed holder 326, which connection pushes into place the O-ring 394 within the annular groove 393.

Referring now to FIG. 3, another customized embodiment of the present invention is illustrated. Many modifications and alternative features are present in this embodiment over that shown in FIG. 2, but in general structure and appearance, this embodiment includes essentially all of the elements and features of the embodiment of FIG. 2. Those features which are different from FIG. 2 will be discussed below while those features of FIG. 2 which are illustrated in FIG. 2 and also appear in FIG. 3 will be discussed only in passing. Where appropriate, those elements which are different will have a "400" series digit prefix and otherwise all of the similar elements will have a "300" digit prefix to indicate their similarity with the elements shown in FIG. 2.

The housing type member 424 is a frusto-conical structure which can be inserted into a housing stuffing box, such as has heretofore been described. For purposes of discussion of this embodiment, the housing type member 424 will be described as being the housing.

The embodiment of FIG. 3 also utilizes a bearing assembly 342 but in this case, the bearing assemblies are attached through a bolt 340 and nut 344 to a flanged retainer 464. The flanged member 464 includes an outwardly radially extending annular flange 462 which is connected to the housing member 424 by a bolt 463. Bolt 463 is threaded into a threaded bore 466 in the housing member 424.

The flanged retainer 464 further comprises a second inwardly radially extending flange 465 which abuts the gland plate 482. Tightening of the bolt 463 on the flange 462 also provides a retaining function on the gland plate 482 by the flange member 465.

A bolt 460 extends through an aperture in the flange 465 and through a second aperture in the gland plate 482 and is screwed into a threaded bore 485 in the adapter 430. Gland plate 482 may include an annular axially extending flange 483 to provide a customized or adjustable connection for the lip 72 of the compression ring 74. As with the embodiment of FIG. 2, the split sealing elements of the seal assemblies 80 is identical to the construction of FIG. 4A of the '163 patent and will not be further discussed herein.

The adapter member again is sealed against the housing member through an O-ring 416 in an annular groove 414. The bushing 477 is disposed within an annular groove 480 and is connected to the adapter 430 through pin 481.

The holder member 426 is in effect two separate elements, retainer 428 and bearing housing 429 which are joined together by bolts (not shown) which juncture is sealed by an O-ring 431. The retainer 428 and the bearing housing 429 together provide a structure which is effectively identical to the structure provided by the holder 326 (FIG. 2). Bearing housing member 429 includes a radially extending flange wall 454 which together with one of the side walls of the retainer 428 provides a housing for the bearings 342.

The retainer 428 also is different in this embodiment and shows an alternative positive drive which allows the retainer 428, bearing housing 429 combination to rotate with the shaft 16, but to be independent in axial movement therefrom. The drive sleeve 490 is in most respects similar to the drive sleeve 390 (FIG. 2) and includes a socket set screw 496 set within a threaded radially extending bore 495 to attach the drive sleeve 490 to the shaft 16. However, the drive sleeve 490 also includes a longitudinal axially extending sleeve extension 435 having at least one longitudinal slot 437 into which at least one corresponding extension or rib 443 of the base 440, defining at least one positive drive means, can be slidably inserted. One of the rib extensions 443 may be available for each separate slot 437 in the drive sleeve extension 435. The base extensions or ribs 443 can slide along in the axial direction for the length of the sleeve extension 435 while simultaneously providing a positive drive thereto and to the retainer 428.

Other alternative arrangements of the sealing components of the invention may become apparent to a person of ordinary skill in the art from a full understanding of the present specification. For example, other positive drive mechanisms may be considered or different designs for making the shaft axially independent of the primary seal ring assembly 404 may be designed. Once the inventive concepts described herein are understood, other embodiments and modifications will become readily apparent to a person of ordinary skill in the art. Accordingly, the above embodiments are described and discussed as examples only and do not limit the scope of the following claims.

What is claimed is:

1. A split mechanical face seal for providing fluid-tight sealing between a housing and a shaft adapted to rotate relative thereto, said split seal comprising:

adjacent, rigid, annular, primary and mating rings formed of a plurality of arcuate ring segments, each defining generally radial, opposed sealing faces;

means for joining and retaining the ring segments of each of said rings in rigid connection with the other segments of each ring, whereby each said opposed sealing face defined by said rings has a smooth surface devoid of discontinuities around its complete circumference, said joining and retaining means further comprising:

a resilient split means for said primary ring and a resilient split means for said mating ring, each said resilient split means positioning and supporting its associated ring in a generally coaxial relationship with the shaft and with the other ring, so that the sealing face of each said ring is in opposite and facing relationship to the sealing face of the other said ring, said resilient split means for said primary ring rigidly supporting said primary ring from axial and radial movement, said resilient split means for said mating ring nonrigidly supporting said mating ring and biasing said mating ring in an axial direction against said primary ring;

a split holder means for said mating ring and a split holder means for said primary ring, said split holder means for said mating ring circumferentially connecting said mating ring resilient split means to said mating in a substantially concentric relationship, said split holder means for said primary ring circumferentially connecting said primary ring resilient split means to said primary ring in a substantially concentric relationship, each said split holder means comprising a pair of semicircular holder members releasably attachable to each other and when in an attached condition, sealingly engaging and compressing to a limited degree at least a portion of each said respective resilient split means upon its associated segmented ring; and a relative axial positioning means for maintaining the position of the split mating ring holder means relative to the split primary ring holder means in a substantially identical relative axial position during shaft rotation, said relative axial positioning means comprising at least one positioning member for axially positioning one of the mating ring holder means or the primary ring holder means relative to the other of the holder means while simultaneously permitting relative rotation of one said holder means relative to the other, said relative axial positioning means enabling said split mechanical face seal to compensate for relative temporary large axial displacements of the primary ring holder means relative to the mating ring holder means.

2. The split mechanical face seal according to claim 1 further comprising a mating ring adapter associated with said mating ring, said mating ring adapter having a cylindrical surface for sealing against the seal housing, and said mating ring adapter being axially displaceable, but rotationally stationary, relative to the housing while maintaining a seal thereagainst, said mating ring adapter being connected to said relative positioning means by said one positioning member.

3. The split mechanical face seal according to claim 2, said mating ring adapter further comprising an annular groove keyway, said shaft further comprising a thrust bearing disposed circumferentially around and being attached to said shaft, said annular groove keyway being shaped and dimensioned to fit closely about said thrust bearing while allowing relative rotation therebetween, and said thrust bearing providing a corresponding axial shift to said mating ring adapter when said shaft and said thrust bearing are axially shifted.

4. The split mechanical face seal according to claim 2 further comprising a bearing assembly and a bearing housing enclosing said bearing assembly, said bearing assembly being attached to said shaft, said bearing housing being displaced axially with said shaft but not rotating therewith, said mating ring adapter being directly connected to said bearing housing, wherein axial displacement of said shaft and said bearing assembly producing a corresponding axial displacement to said bearing housing and said mating ring adapter.

5. The split mechanical face seal according to claim 1 wherein said relative positioning means further comprises a bearing assembly connected to said seal housing, said primary ring split holder means being axially stationary relative to said housing, said primary ring split holder means further comprising an annular groove defined by two radially extending side walls, said groove being shaped and dimensioned to receive said bearing assembly connected to said seal housing, said bearing assembly maintaining the position of said primary ring holder means in the identical axial position relative to said seal housing while permitting said primary ring split holder means to rotate with said shaft, said another seal element against which said primary ring holder means cylindrical surface is sealed against further comprises a drive member being sealingly connected to said shaft and being axially displaceable relative to said primary ring holder means, said drive member being sealed against said primary ring holder means during shaft rotation, said drive member further comprising an axially slidable means for rotationally driving said primary ring split holder means rotationally with said shaft.

6. The split mechanical face seal according to claim 5 wherein said drive member axially slidable means comprises at least one longitudinally extending slot on said split holder means and said drive member further comprises at least one corresponding pin which is shaped and dimensioned to fit within each said slot to provide to said drive member an axial freedom of movement relative to said primary ring holder means while simultaneously causing said pins to rotationally drive said primary ring split holder means.

7. The split mechanical face seal according to claim 2 wherein said mating ring adapter further comprises an annular, circumferential, inner diameter groove for receiving a flexible bushing, and said split mechanical face seal further comprises a flexible bushing attached to said mating ring adapter in surrounding relationship to said shaft, said flexible bushing comprising a material which permits said shaft to rotationally and axially move relative to said bushing through a relatively frictionless engagement therebetween.

8. The split mechanical face seal according to claim 5 wherein said drive member further comprises a longitudinally extending annular extension having at least one longitudinally extending slot, and said axially slidable means comprises a corresponding rib for engaging each said slot, each rib extending from a radially inward portion of said primary ring adapter, one of said ribs being shaped and dimensioned to fit within each said slot to permit the drive member an axial freedom of movement relative to said primary ring adapter while simultaneously causing said slots to drive said ribs, said primary ring adapter and said primary ring split holder rotationally together with said shaft.

9. The mechanical face seal according to claim 5, wherein said mating ring adapter further comprises an annular circumferential groove for receiving a flexible bushing, and said split mechanical face seal further comprises a flexible bushing attached to said mating ring adapter in surrounding relationship to said shaft and comprising a material which permits said shaft to rotationally and axially move relative to said bushing through a relatively frictionless engagement therebetween.

10. The mechanical face seal according to claim 5 wherein said primary ring split holder means comprises two separate joined segmented annular portions which are bolted to each other, the split holder means providing a radially extending wall defining at least one wall of the groove for receiving said bearing assembly.

11. A split mechanical face seal for providing fluid-tight sealing between a housing and a shaft adapted to rotate relative thereto, said split seal comprising:

adjacent, rigid, annular, primary and mating rings formed of a plurality of arcuate ring segments, each defining generally radial, opposed sealing faces;

means for joining and retaining the ring segments of each of said rings in rigid connection with the other segments of each ring, whereby each said opposed sealing face defined by said rings has a smooth surface devoid of discontinuities around its complete circumference, said joining and retaining means further comprising:

a resilient split means for said primary ring and a resilient split means for said mating ring, each said resilient split means positioning and supporting its associated ring in a generally coaxial relationship with the shaft and with the other ring, so that the sealing face of each said ring is in opposite and facing relationship to the sealing face of the other said ring, said resilient split means for said primary ring rigidly supporting said primary ring from axial and radial movement, said resilient split means for said mating ring nonrigidly supporting said mating ring and biasing said mating ring in an axial direction against said primary ring;

a split holder means for said mating ring and a split holder means for said primary ring, each split holder means circumferentially connecting said respective resilient split means to its associated ring in a substantially concentric relationship, each said split holder means comprising a pair of semicircular holder members releasably attachable to each other and when in an attached condition, sealingly engaging and compressing to a limited degree and providing radial rigidity to at least a portion of said respective resilient split means upon its associated segmented ring;

whereby the primary ring, the resilient split means for positioning said primary ring and the primary ring split holder means define a primary ring assembly and whereby the mating ring, the resilient split means for positioning said mating ring and the mating ring split holder means define a mating ring assembly; and a relative positioning means for maintaining the position of the mating ring assembly relative to the primary ring assembly in a substantially identical relative axial position during shaft rotation, said relative positioning means comprising at least one axial positioning member for axially positioning one of the mating ring assembly or primary ring assembly relative to the other said ring assembly while simultaneously permitting relative rotation of one said ring assembly relative to the other so as to compensate for temporarily large axial displacement of the shaft relative to the housing.

12. The split mechanical face seal according to claim 11 further comprising an adapter associated with said mating ring, said mating ring adapter being axially displaceable, but rotationally stationary, relative to the housing while maintaining a seal thereagainst, said relative positioning means causing axial displacement of said mating ring adapter corresponding to the axial displacement of said shaft.

13. The split mechanical face seal according to claim 12, said mating ring adapter further comprising an annular groove keyway, said one axial positioning member further comprising a thrust bearing disposed circumferentially around and being attached to said shaft, said annular groove keyway being shaped and dimensioned to fit closely about said thrust bearing while allowing relative rotation therebetween, and said thrust bearing providing a corresponding axial shift to said mating ring adapter when said shaft and said thrust bearing are axially shifted.

14. The split mechanical face seal according to claim 12 further comprising a bearing assembly and bearing housing enclosing said bearing assembly, said bearing assembly being attached to said shaft, said bearing housing being displaced axially along with said shaft but not rotating therewith, said mating ring adapter being directly connected to said bearing housing, wherein axial displacement of said shaft and said bearing assembly causes a corresponding axial displacement to said bearing housing and said mating ring adapter.

15. The split mechanical face seal according to claim 11, wherein said one axial positioning member further comprises a bearing assembly connected to said seal housing and a bearing housing enclosing said bearing assembly, said bearing housing maintaining the axial position of said primary ring holder means axially stationary relative to said seal housing, said primary ring split holder means having an annular groove defined by two radially extending side walls, said annular groove being shaped and dimensioned to receive said bearing housing connected to said seal housing, said bearing assembly and said bearing housing maintaining the position of said primary ring split holder means in an axially stationary position relative to said seal housing while permitting said primary ring split holder means to rotate with said shaft, said seal further comprising a drive member being sealingly connected to said shaft and being axially displaceable relative to said primary ring holder means, said drive member being sealed against said primary ring holder means during shaft rotation, said drive member further comprising an axially slidable means for rotationally driving said primary ring assembly rotationally with said shaft.

16. The split mechanical face seal according to claim 15 wherein said drive member axially slidable means comprises at least one longitudinally extending slot disposed on said primary ring split holder means and said drive member further comprises at least one corresponding pin which is shaped and dimensioned to fit within each said slot to provide to said drive member an axial freedom of movement relative to said primary ring assembly while simultaneously causing said at least one pin to rotationally drive said primary ring assembly.

17. The split mechanical face seal according to claim 16 further comprising a mating ring adapter having an annular, circumferential, inner diameter groove for receiving a flexible bushing, and said split mechanical face seal further comprises a flexible bushing attached to said mating ring adapter in surrounding relationship to said shaft, said flexible bushing comprising a material which permits said shaft to rotationally and axially move relative to said bushing through a relatively frictionless engagement therebetween.

18. The split mechanical face seal according to claim 15 wherein said drive member further comprises a longitudinally extending annular extension having at least one longitudinally extending slot, and said axially slidable means comprises a corresponding rib for engaging each said slot, each rib extending from a radially inward portion of said primary ring split holder means, one of said ribs being shaped and dimensioned to fit within each said slot to permit the drive member an axial freedom of movement relative to said primary ring assembly while simultaneously causing said slots to drive said ribs and said primary ring assembly rotationally together with said shaft.

19. The split mechanical face seal according to claim 12 wherein said mating ring adapter further comprises an annular circumferential groove for receiving a flexible bushing, and said split mechanical face seal further comprises a flexible bushing to said mating ring adapter in surrounding relationship to said shaft and comprising a material which permits said shaft to rotationally and axially move relative to said bushing through a relatively frictionless engagement therebetween.

20. The mechanical face seal according to claim 15 wherein said split holder means comprises two separate joined segmented annular portions which are bolted to each other, the split holder means providing a radially extending wall defining at least one wall of the groove for receiving said bearing assembly housing.

* * * * *